United States Patent [19]

Roodenrijs et al.

[11] Patent Number: 4,787,985
[45] Date of Patent: Nov. 29, 1988

[54] MULTI-STAGE PURIFICATION UNIT PROCESS

[75] Inventors: Jacobus P. Roodenrijs, St. Michielsgestel; Wilhelmus H. J. M. Van Pelt, Liempde, both of Netherlands

[73] Assignee: Grenco Process Technology B.V., Hertogenbosen, Netherlands

[21] Appl. No.: 89,160

[22] Filed: Aug. 25, 1987

[51] Int. Cl.⁴ ............................................. B01D 9/04
[52] U.S. Cl. ................................... 210/772; 210/260; 210/409; 210/413; 210/415; 23/301; 62/541
[58] Field of Search ........................... 23/301; 62/541; 210/259, 260, 407, 408, 413, 415, 770, 772

[56] References Cited

U.S. PATENT DOCUMENTS

| | | | |
|---|---|---|---|
| 4,004,886 | 1/1977 | Thijssen et al. | 62/541 X |
| 4,459,144 | 7/1984 | Van Pelt et al. | 62/541 |
| 4,508,553 | 4/1985 | Thijssen et al. | 62/541 |

Primary Examiner—Charles Hart
Attorney, Agent, or Firm—Cushman, Darby & Cushman

[57] ABSTRACT

A counter-current process for purifying chemicals using cyrstal purification. The unit process has a purification and recovery section which contain substantially identical stages. In operation, the unit process purifies the chemical by utilizing sequential recrystallizer. The size and purity of the crystals increases from the last recrystallizer in the recovery section through each subsequent stage to the last recrystallizer in the purification section.

17 Claims, 5 Drawing Sheets

MULTI-STAGE PURIFICATION UNIT PROCESS

BACKGROUND AND SUMMARY OF THE INVENTION

The present invention relates to a multi-stage counter-current crystallization purification process for use in chemical operations where a high degree of purity is required for the end product.

A number of different crystallization systems have been proposed to purify various chemical feeds or to recover a specific component from a feed mixture, but none of the systems employed presently have been completely satisfactory. The disadvantages with the present systems are that they are either unable to achieve the required level of purity, or else they are extremely complicated and expensive in both capital equipment and operating costs. Accordingly, crystallization purification has had only limited application in the chemical process industry.

Crystallization purification is also employed in the food process industry. One system which has been successful is the two stage continuous process concentrating system described in the patent to Thijssen et al, U.S. Pat. No. 4,004,886. In this system a slurry of seed ice crystals and mother liquor are produced in a scraped surface heat exchanger and continuously supplied to a recrystallizer in which the crystals grow. The mother liquor in the recrystallizer is continuously mixed and recirculated to the scraped surface heat exchanger via a filter which prevents crystals from leaving the recrystallizer. The mother liquor is consequently mixed with the return of the wash column and the process feed, passes the scraped surface heat exchanger and is recirculated to the recrystallizer. Almost all of the small crystals in the recrystallizer melt and reform on a few seed crystals to produce a crystal slurry having relatively uniform-sized crystals therein, which slurry is removed continuously from the recrystallizer as a crystal suspension. While others in the past have proposed systems using both scraped surface heat exchangers and larger tanks in which crystal growth takes place, for example, the patent to Walker U.S. Pat. No. 3,156,571, it is the melting of the vast majority of the ice crystals provoked by the recirculation only of substantially crystal free liquid from the recrystallizer which reduces the residence time and produces the uniform crystal size in both the system described in the Thijssen et al patent. The uniform crystal size in particular permits use of wash columns in the system instead of centrifuges or other separating devices which have technical and other disadvantages.

The slurry which is removed from the recrystallizer in the above-described system of the Thijssen et al patent is preferably supplied to a wash column, for example, as described in the Thijssen U.S. Pat. Nos. 3,872,009 and 3,777,892. In this particular wash column, the slurry is supplied to the bottom of a column and then compacted against the ice mass by a piston which periodically pushes the mass upward. The ice at the top of the column is chopped and removed from the column. Subsequently, it is melted and at least in part returned to the column to flow downward when the piston applies pressure to the bottom of the column to maintain a stable wash front. The mother liquor is removed as concentrated liquor through perforations in the piston. Other subsequent systems operate continuously.

Subsequent work resulted in the development of a multi-stage system using the method and apparatus of the Thijssen '886 patent as the basic component. A plurality of Thijssen et al type concentrating units are connected together for counter-current operation.

In a first stage which receives the feed liquid to be concentrated and produces a first intermediate concentration solution, a slurry of ice crystals and liquid in a recrystallization vessel are supplied to a separator such as a wash column and the intermediate concentrated solution is passed to a second stage. The ice crystals from the second stage are passed counter-current to the direction of flow of the aqueous liquid and supplied to the recrystallization vessel of the first stage. Almost all of the seed crystals produced in the first stage, for example, by a scraped surface heat exchanger, then melt and reform upon the larger crystals supplied from the second stage. Third and additional stages can also be provided, each passing at least the ice back directly to the recrystallization vessel of the preceding stage so that the crystal growth takes place mainly on the crystals which are supplied from the succeeding stage and practically all of the crystals generated in each stage except the last melt and reform thereon.

This multi-stage system is described in, e.g., Van Pelt et al, U.S. Pat. Nos. 4,316,368, 4,430,104 and 4,459,144.

It has now been discovered that a multi-stage counter-current crystallization system can be adapted for use in the chemical process industry for recovery and purification of chemicals.

The present invention makes use of substantially identical stages in series. The number of stages is primarily dependent on the specific requirements of the feed mixture, the final product, and the waste product. In one embodiment the unit process is comprised of a recrystallizer with a filter, a crystallizer, a separator; either a thickener or wash column, and associated piping and pumping equipment. This basic unit is then simply repeated sequentially as many times as is necessary for the desired level of purification and/or recovery of a specific chemical in the feed mixture. This concept reduces both engineering time and cost as well as equipment manufacturing time and cost. The unit process is divided into two sections, a recovery section and a purification section. Each of these sections has predetermined numbers of sequential stages depending on the specific application. Because the stages are substantially identical, even in the two sections, the unit process of the present invention has remarkable flexibility. The unit process of the present invention is also very energy efficient and is ideally suited for the use of multiple heat pumps.

The processing unit is divided into two sections, a purification section and a recovery section. The feed mixture is fed into a wash column located in the purification section. In certain instances, e.g. when the feed already contains crystals, it can be processed in only that wash column. Some feed mixtures may require a purification section comprised of two or more wash columns in series. If necessary, the purification section can be expanded in stages. Each subsequent stage of the purification section is substantially identical and is comprised of an additional wash column, and possibly but necessarily, also comprised of the following equipment; a recrystallizer intermediate the wash columns, at least one filter unit associated with the recrystallizer, and at least one crystallizer which forms crystals to be fed to the recrystallizer.

The recovery section in one embodiment is comprised of plurality of substantially identical stages. The only stage that is different is the stage adjacent to the first wash column in the purification section. The stage adjacent the wash column is comprised of a recrystallizer, at least one filter associated with said recrystallizer, and at least one crystallizer for forming crystals to be fed to the recrystallizer. No thickener is required because of the presence of the adjacent wash column.

The other stages in the recovery section have a thickener for concentrating the crystals removed from the recrystallizer which are then fed to the recrystallizer in the adjacent stage.

DETAILED DESCRIPTION OF THE PREFERRED EMBODIMENTS

Figure 1:
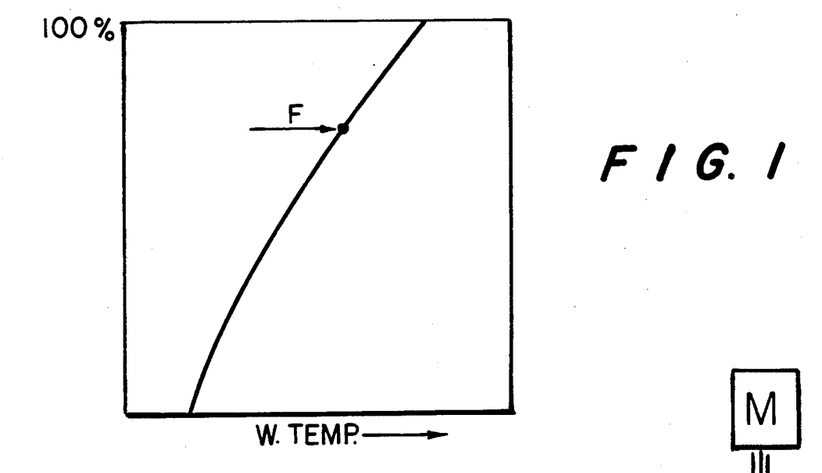
FIG. 1 shows an example of a typical phase diagram.

FIG. 1 is an example of a typical phase diagram. A feed mixture F is split into a product flow P and a waste flow W. The concentration of the product and waste are determined by the specific application. The area between F and W is the recovery side of the system and the area between F and P is the purification side of the system.

One significant difference between the chemical process industry and the food process industry is that the equilibrium temperature difference between F and W and F and P is larger in the chemical process industry than the food process industry. As a result, there are certain advantages in employing multiple stages for purification in the chemical industry.

Figure 2:
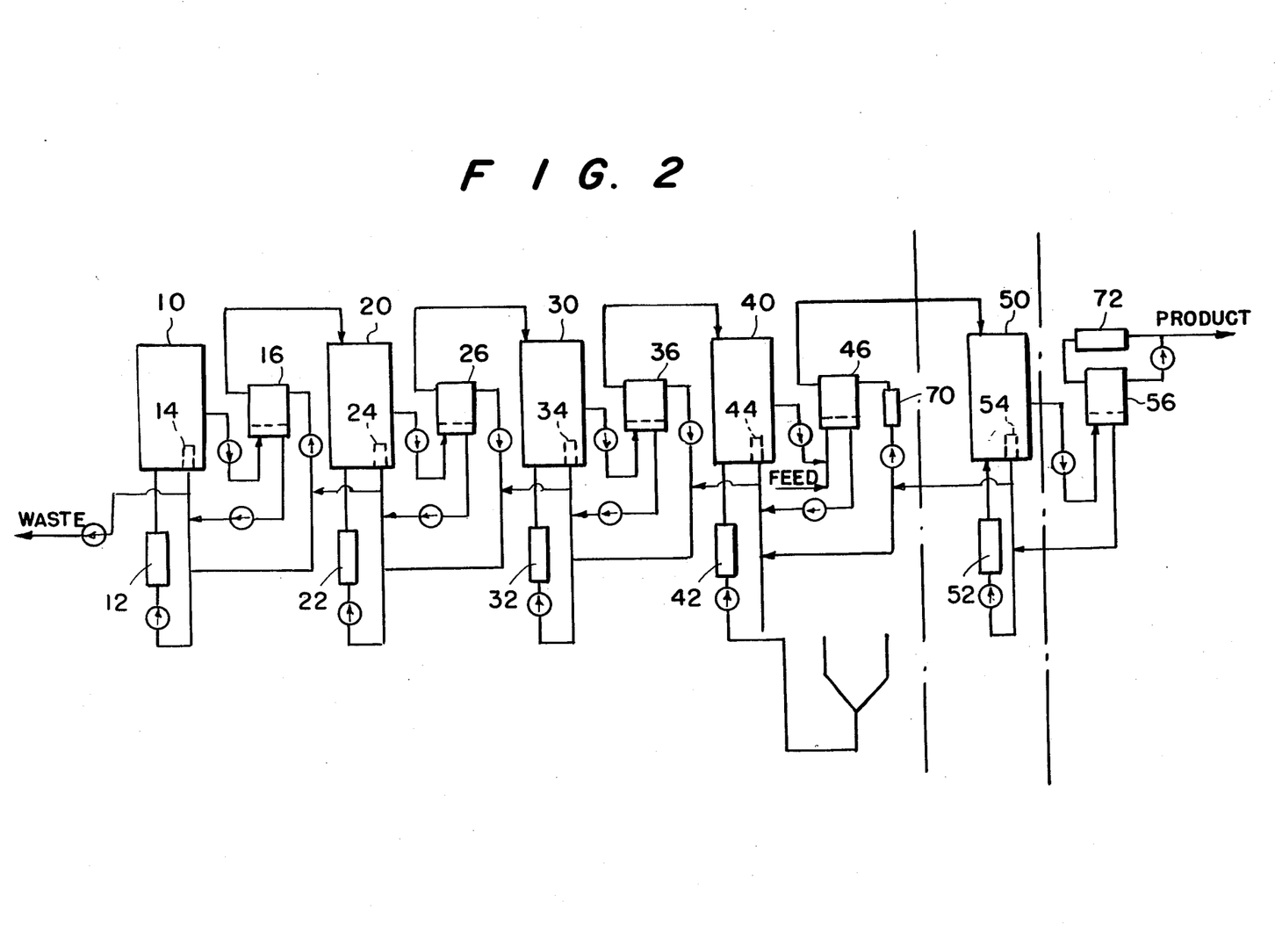
FIG. 2 shows a schematic of one embodiment of a multi-stage counter-current crystallization unit process of the present invention.

FIG. 2 is a schematic of one embodiment of the multi-stage counter-current unit process of the present invention. The unit system is comprised of a predetermined number of stages. Each stage is, in general, comprised of a recrystallizer 10, 20, 30, 40, 50, at least one crystallizer 12, 22, 32, 42, 52, at least one filter 14, 24, 34, 44, 54, and a thickener or wash column 16, 26, 36, 46, 56.

The basic operation of each stage is described in the Thijssen et al patent, U.S. Pat. No. 4,004,886, which is incorporated herein by reference. The basic operation of the complete system is described in the patents to Van Pelt et al, U.S. Pat. Nos. 4,430,104, 4,316,368 and 4,459,144, which are incorporated herein by reference. However, there are notable exceptions which will be discussed below.

The number of stages in the purification and recovery sections and the point at which the feed mixture F is fed into the system are determined during the design stage and will vary depending, inter alia, on the composition of the feed mixture and the desired purities of the product and waste flows. This will be discussed in detail below.

Figure 3:
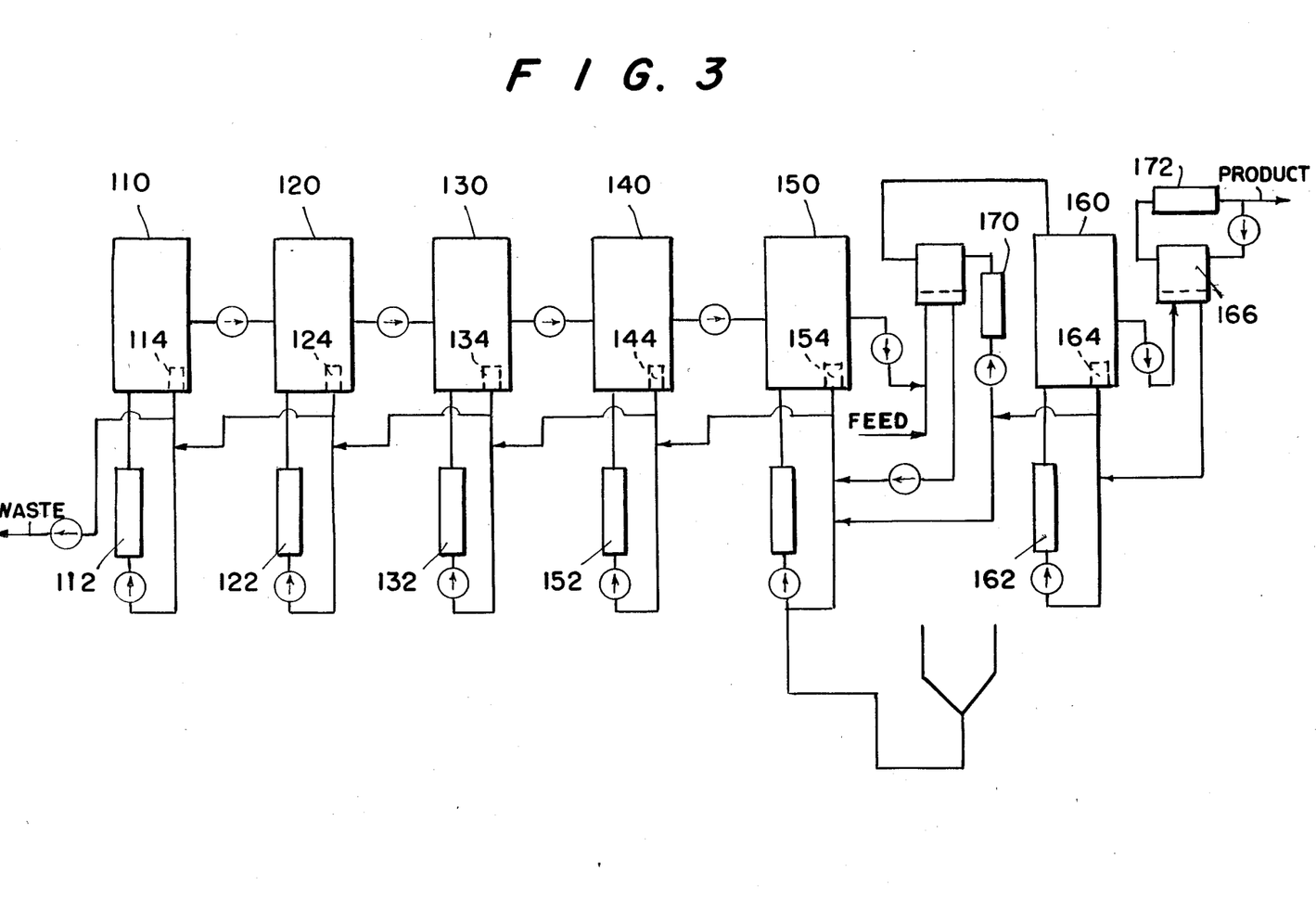
FIG. 3 shows a schematic of a second embodiment of a multi-stage counter-current crystallization unit process of the present invention.

In essence, the system shown in FIG. 2 operates as follows. Based on the phase diagram of the feed mixture and the desired purities of the product and waste flows, calculations are made which determine, inter alia, the number of stages and the exact location of the feed mixture inlet into the unit process. The location of the feed mixture inlet divides the overall unit process into a recovery section and a purification section. These sections correspond to the portions of the phase diagram between feed mixture and waste and product, respectively. The unit process, as illustrated in FIGS. 2 and 3, is remarkably flexible and can be easily adjusted by changing the feed mixture inlet point and/or the number of stages in either section.

In the recovery section, thickeners 16, 26, 36 are employed after each recrystallizer in order to increase the concentration difference between the adjacent stages. In the purification section, wash columns 46, 56 are used instead of thickeners after each recrystallizer. While the design of the thickeners and wash columns are substantially identical, they operate differently. With the thickener, a limited amount of liquid is allowed with the crystals over the top of the thickener. With the wash column, only crystals are removed over the top. There is also substantial crystal growth inside the wash column as compared with negligible growth in the thickeners.

The unit process according to the embodiment of FIG. 2 operates essentially as follows. The unit process is comprised of a purification section and a recovery section. The portion of the unit process from the feed mixture inlet to the product flow is the purification section and the portion from the feed mixture inlet to the waste flow is the recovery section.

The feed mixture is introduced into the first wash column 46 of the purification section together with a crystal and liquid slurry from the last recrystallizer 40 into the recovery section. Crystals only are removed over the top of wash column 46 and are fed into the first recrystallizer 50 of the purification section. Liquid is fed from the wash column 46 back to the last crystallizer 40 in the recovery section.

In the first recrystallizer 50 in the purification section, the crystals from the wash column 46 act as seed crystals. The crystals produced in the crystallizer 52 which are formed from the liquid removed by the filter unit 54 associated with the recrystallizer 50 and from liquid from the wash column 56 melt within the recrystallizer 50 and reform over the seed crystals. The crystallizer 52 may be a scraped surface heat exchanger.

A slurry of crystals and liquid is removed from the recrystallizer 50 and fed to a second wash column 56. Crystals are removed over the top of the wash column 56 and are fed to a heat exchanger 72 in which the crystals are melted resulting in the product flow. Liquid is removed from the wash column 56 and fed to the recrystallizer 52.

If necessary, the purification section can be expanded by additional sequential stages. Each additional stage can comprise a crystallizer, a recrystallizer with associated filter unit, and a wash column. The operation of each sequential stage will be substantially identical to the operation already described.

As discussed above, one possible variation in the design of the purification section is to simply employ a wash column. The feed mixture is fed into the wash column. The crystals are then melted in a heat exchanger giving the resultant product.

A second variation is to employ two wash columns without a crystallizer and recrystallizer. This configuration can be used when the crystals coming from the first wash column 46 are of sufficient size and purity to produce the desired product as top product of wash column 56. In this case, the recrystallizer and crystallizer between the two wash columns are not necessary because the level of purification and crystal growth produced by such a configuration is not required. The two wash column option operates as follows. Crystals from the top of the wash column 46 are fed to the wash column 56. The liquid flow from the wash column 56 is fed, in part through the heat exchanger 70 into the wash column 46. There is crystal growth in both of these wash columns.

The number of crystallizers in each stage, whether in the purification or recovery section, may vary in order to optimize specific appiications. Similarly, there must be at least one filter for each crystallizer but the number of filters may vary depending upon specific applications.

The recovery section is comprised of a plurality of substantially identical stages which operate similarly. The stage in the recovery section adjacent the first wash column in the purification section is usually referred to as the last stage in the recovery section and is somewhat different from the other stages in the recovery section. This stage has a recrystallizer 40 which receives a liquid and crystal slurry from the preceding thickener 36. Associated with the recrystallizer 40 is a filter unit 44 and a crystallizer 42 which receives liquid from the recrystallizer 40, the wash column 46, and the recrystallizer 50. Crystals are formed within the crystallizer 42 and fed to the recrystallizer 40 where the crystals melt and reform on the crystals supplied from the thickeners 36.

Liquid from the filter unit 44 is fed to the thickener 36 and the crystallizer 32 in the preceding recovery stage. Liquid and crystal slurry from the thickener 26 in the preceding recovery stage is fed to the recrystallizer 30.

The crystals from the thickener 26 act as seed crystals in the crystallizer 32. The crystals from the recrystallizer 32 melt and reform over the seed crystals. All of the recovery stages before the last stage operate in this manner except the first recovery stage. A liquid and crystal slurry is fed from the crystallizer 12 to the recrystallizer 10. The liquid from the associated filter unit 14 is split into the feed to the crystallizer 12 and the waste flow. The liquid and crystal slurry from the recrystallizer is fed to the thickener 16 with the concentrated slurry of liquid and crystals fed to the next recrystallizer 20 while the liquid underflow is fed to the crystallizer 12.

Figure 2A:
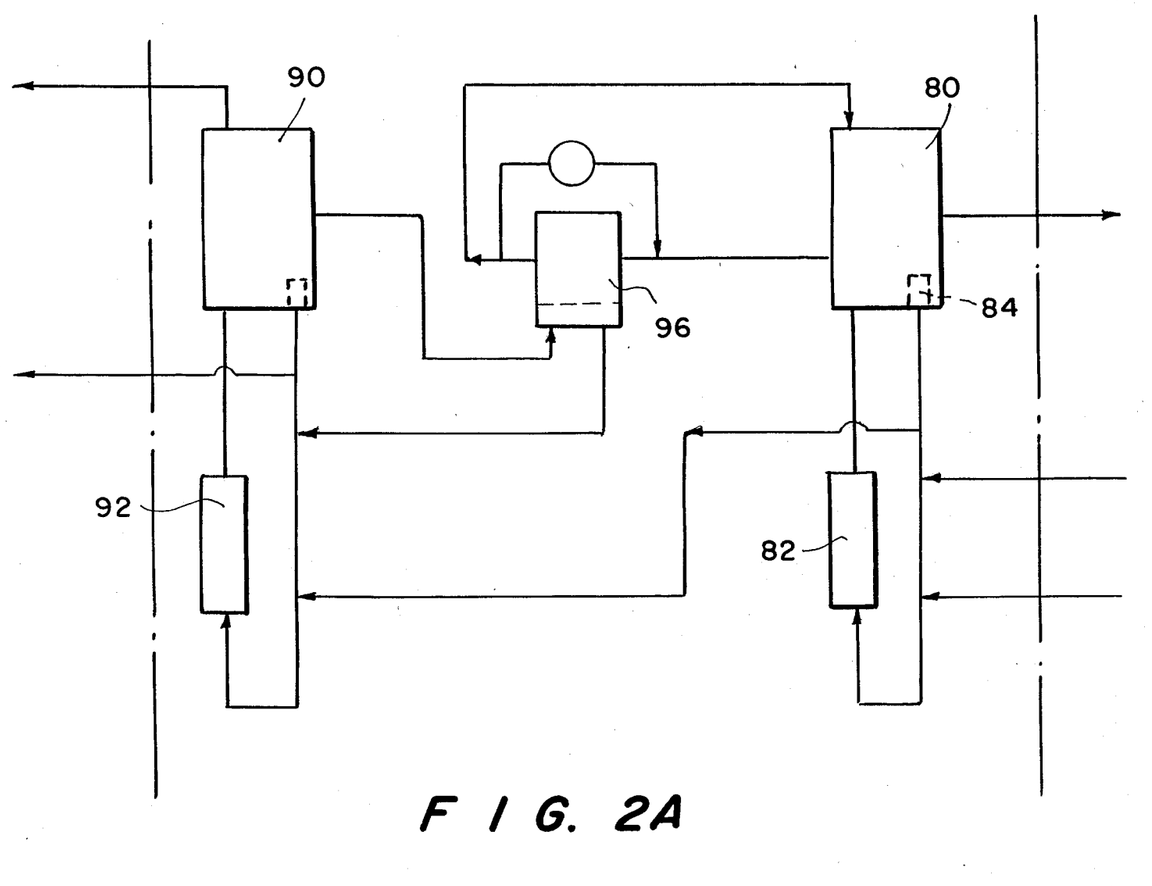
FIG. 2A shows the same embodiment as in FIG. 2, the only difference being the use of a slurry stream instead of a liquid stream to rinse the top of the thickeners.

Another embodiment of the process is to eliminate from the recovery section the flow of liquid from the filter associated with the recrystallizer to the thickener in the preceding section. Instead, a slurry is fed from the recrystallizer directly to the preceding thickener. The liquid flow from the filter is fed to the preceding crystallizer. This embodiment is shown in FIG. 2a. Part of the liquid fom the filter 84 is fed directly to crystallizer 92. The liquid and crystal slurry from the recrystallizer 80 is fed to the thickener 96. In order to prevent the top of the thickener 96 from plugging with crystals, additional circulation is provided over the top.

In operation, both the purity of the mother liquid and the mean size of the crystals being processed increase from the first recrystallizer in the recovery stage to the recrystallizer in each succeeding stage.

Although the system shown in FIG. 2 employs a thickener after each recrystallizer in the recovery section of the unit process, it is also possible to have a process, as shown in FIG. 3, which does not require thickeners. Instead, the number of stages in the recovery section is increased. This once again demonstrates the flexibility of the present invention.

As can be seen from FIG. 3 by increasing the number of stages in the recovery section, the equipment in each stage can be reduced. There is no need for thickeners and the overall piping and pumping can be significantly simplified. Unlike the unit process of FIG. 2, each recovery stage in the process of FIG. 3 is identical. The major pieces of equipment are the recrystallizer with associated filter unit, and the crystallizer.

The operation of the recovery stages can be illustrated by reference to the last recovery stage, i.e., the stage adjacent the first wash column. Liquid is fed to the crystallizer 152 from the wash column 156 and the recrystallizers 150 and 160. Small crystals are formed in the crystallizer 152 and fed to the recrystallizer 150. These crystals melt and reform on the seed crystals from the recrystallizer 140.

A liquid and crystal slurry is fed into the recrystallizer 150 directly from the preceding recrystallizer 140. These become the seed crystals in the recrystallizer 150. Liquid from the filter unit 154 associated with recrystallizer 150 is fed to crystallizers 142 and 152.

Each preceding stage in the recovery section operates in a similar manner except the first stage. In the first stage, the liquid from the filter unit 114 is split into a waste flow and fed to the crystallizer 112. As with the unit process of FIG. 2 the purity increases incrementally from the recrystallizer in the first stage of the recovery section to the recrystallizer in each subsequent stage. Also, as with the process of FIG. 2, the mean size of the crystals increases as the crystals progress from the recrystallizer in the first stage of the recovery section to the recrystallizer in each subsequent stage until they are at maximum size in the last recrystallizer.

The feed mixture can be supplied to the first wash column in any number of ways but the most practical are from either a gravity or pressurized tank. These tanks control the pressure within the unit process and also provide for system expansion as volumes fluctuate. If desired, the feed mixture can be circulated over the first wash column. Also, the feed mixture can be pre-cooled to almost the equilibrium temperature.

The flow back to wash column from the recrystallizer (50 of FIG. 2 and 160 of FIG. 3), is referred to as the rinsing loop of the first wash column, and is through a heat exchanger 70, 170. This heat exchanger controls the amount of recrystallization on the cold crystals from the recrystallizer in the last stage of the recovery section. The heat supplied by this heat exchanger can be controlled in such a way that subcooling of the seed crystals coming from the preceding recrystallizer is compensated for. This prevents or melts it when already formed, the formation of an outer layer on the seed crystals. Said layer can, due to the rapid crystallization, have a relatively high impurity concentration.

The product flow exits the final wash column in the purification section. The number of wash columns and recrystallizers in the purification section will vary depending on the desired parameters of the chemical system being processed.

Figure 4:
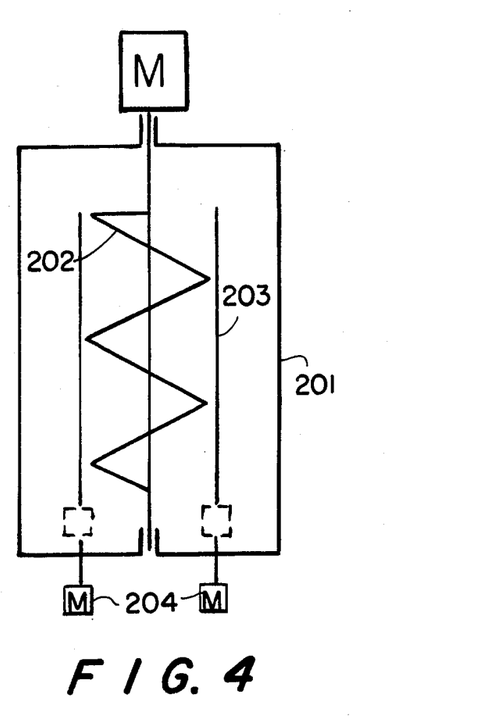
FIG. 4 shows a schematic representation of one embodiment of a recrystallizer employed in the present invention.

FIG. 4 is a schematic illustration of one embodiment of a recrystallizer according to the present invention. The recrystallizer 201 has an agitator. The agitator illustrated is a helical screw 202 in a draught tube 203 but other configurations are possible. At least one filter unit 204 is used in conjunction with the recrystallizer vessel and can be mounted on the top or bottom of the recrystallizer vessel.

Figure 5:
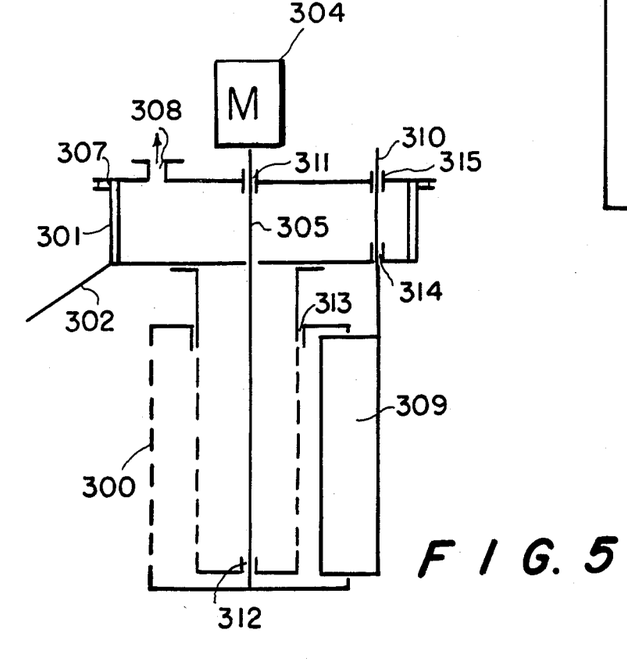
FIG. 5 shows a schematic representation of one embodiment of a filter employed in the present invention.

FIG. 5 is a schematic illustration of one embodiment of the filter unit of the present invention. The filter unit 300 is flange mounted over a hole 301 either in the bottom or top of the recrystallizer vessel 302. A cylindrical filter 303 is rotated by a drive motor 304 via a drive shaft 305. The rotating filter 303 is supported by a stationary hollow perforated shaft 306 positioned on a hollow box 307 having an exit 308. As the filter rotates, the liquid passes through the filter and the perforations in the shaft 306 into the hollow box 307 and out of the unit through exit 308.

The crystals deposited on the filter 303 are scraped off the filter 303 by a scraper blade which may be flexible 309 mounted on an adjustable stationary shaft 310. The shaft 310 is adjustable by means (not shown) located external of the recrystallizer vessel 302.

Figure 6:
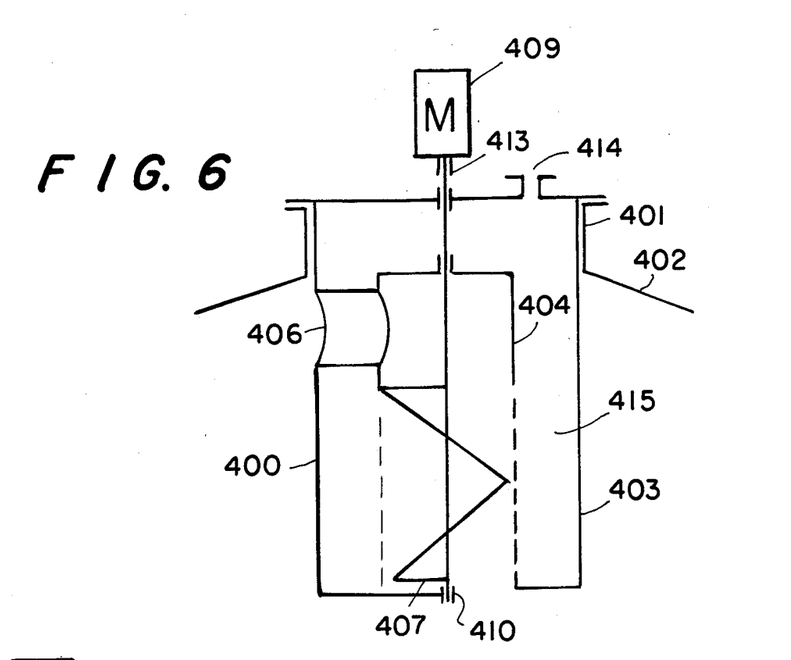
FIG. 6 shows a schematic representation of a second embodiment of a filter employed in the present invention.

FIG. 6 is a schematic illustration of another embodiment of the filter unit according to the present invention. This filter is further described and claimed in a copending application, entitled "Apparatus for Separating a Mixture into Solid," Ser. No. 51,796, filed May 20, 1987, the disclosure of which is incorporated herein. The filter unit is flange mounted over a hole 401 in either the bottom or top of the recrystallizer 402. The filter unit has a stationary cylindrical filter 403 which forms the lower portion of an inner cylinder 404. Positioned around and convected to the inner cylinder 404 is an outer cylinder 405. The concentric annular space formed between the inner and outer cylinder is closed to the recrystallizer 402 and the ambient air. The inner and outer cylinders are connected by a number of ports 406. A helical rotating screw 407 is driven by a motor drive 409 via shaft 408.

The liquid passes through the filter 403 the annular space and out the exit 414. The slurry passes through the port 406 into the inner cylinder 404 through the filter 403 and out the inner cylinder 404 at the bottom. The helical screw 407 and the filter 403 form a narrow slot for removal of the filter cake and bulk flow of the slurry. A circumferential scraper may also be employed to remove the filter cake and the bulk flow of the slurry.

Figure 7:
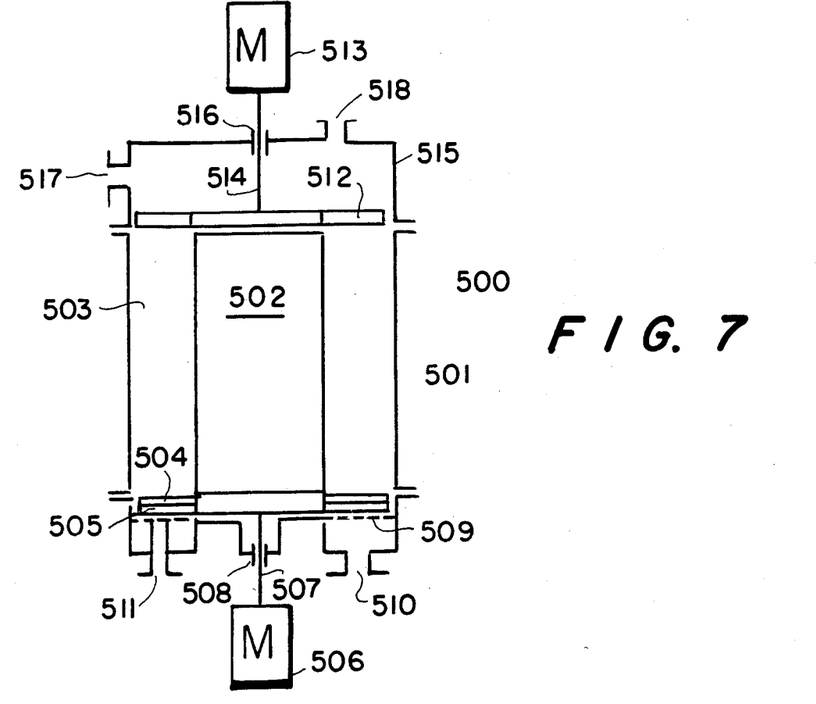
FIG. 7 shows a schematic of one embodiment of a thickener or wash column employed in the present invention.

FIG. 7 is a schematic illustration of one embodiment of the thickener or wash column of the present invention. The thickener or wash column has an outer 501 and inner cylinder 502 forming an annular space 503. The inner cylinder 502 is attached to the outer cylinder 501 by a plurality of supporting strips in the form of helical vanes 504. One side of the annular space 503 is partially closed by a rotating transport disk 505 having a plurality of helical vanes and slots. The disk 505 is driven by a drive motor 506 via a shaft 507 which passes through a bearing seal assembly 508. A stationary filter plate 509 is positioned below the disk 505 with or without scraping means between the disk 505 and the filter plate 509.

Below the filter plate 509 is a space connected by outlet 510 to the exterior of the thickener. There is an inlet 511 from the thickener exterior through which the crystal/liquid slurry passes into the area between the disk 505 and the filter plate 509.

The crystals are transported through the annular space 503 to a rotating scraper disk 512 which partially close the annular space 503. The rotating scraper disk 512 is a plate with at least one slot having a scraper edge. The scraper disk 512 is driven by a drive motor 513 via shaft 514 passing through a cover 515 at a bearing seal assembly 516. The cover 515 has at least one inlet 517 and at least one outlet 518 for a rinsing liquid to convey the scraped crystals through the outlet 518. The rinsing fluid can be the melt from the crystals.

Another embodiment of the thickener/wash column is described in U.S. Pat. Nos. 3,777,892 and 3,872,009.

EXAMPLES

Example 1

A mixture feed (F) containing 40% paraxylene is to be fed to a unit process as illustrated in FIG. 2. The object is to produce almost 100% pure paraxylene. The paraxylene is to be recovered in the waste flow (W) at 9.5%. A mixture feed of 4500 kg/hour will yield almost 1517 kg/hour of pure paraxylene and 2983 kg/hour of waste with 9.5% paraxylene. Because extra crystals have to be produced to compensate for the heat of the feed, it is assumed that the unit process of FIG. 2 generates 400 kg/hour of crystals per stage in four stages, and accordingly the following calculations are made:

| Recrystallizer | | Paraxylene concentration | Equilibrium temperature °F. | Temperature Difference With Preceding Stage Δ °F. |
|---|---|---|---|---|
| Stage I | W = | 9.5% | −76° F. | >32 |
| Stage II | | 19.6% | −44° F. | >19 |
| Stage III | | 27.8% | −25° F. | >13 |
| Stage IV | | 34.5% | −12° F. | >9 |
| Feed | | 40% | −3° F. | |

Assuming that the unit process of FIG. 3 generates 320 kg/hour of crystals per stage in five stages, the following calculations are made:

| Recrystallizer | | Paraxylene concentration | Equilibrium temperature °F. | Temperature Difference With Preceding Stage Δ °F. |
|---|---|---|---|---|
| Stage I | W = | 9.5% | −76° F. | >26 |
| Stage II | | 16.8% | −50° F. | >17 |
| Stage III | | 23.2% | −33° F. | >10 |
| Stage IV | | 28.8% | −23° F. | >9 |
| Stage V | | 33.7% | −14° F. | >11 |
| Feed | | 40% | −3° F. | |

Assuming that the system of FIG. 2 generates 400 kg/hour of crystals per stage in four stages, the following calculations are made:

| Recrys-tallizer | | Paraxylene concentration | Equilibrium temperature °F. | Temperature Difference With Preceding Stage Δ °F. |
|---|---|---|---|---|
| Stage I | W = | 9.5% | −76° F. | >30 |
| Stage II | | 18.1% | −46° F. | >17 |
| Stage III | | 25.5% | −29° F. | >12 |
| Stage IV | | 31.8% | −17° F. | >14 |
| Feed | | 40% | −3° F. | |

The quantity of crystals produced per stage will effect the concentration profile.

The purification sections of the unit processes illustrated by FIGS. 2 and 3 are identical. If the liquid in the last stage of the recovery section is sufficiently pure, then only one wash column can be employed without a recrystallizer and a second wash column. If an unacceptable quantity of impurities pass over the top of the wash column, then at least two wash columns are needed with a recrystallizer located intermediate the wash columns.

In stage IV of the system of FIG. 2, the concentration of paraxylene is 34.5% (−12° F.) while the melting point of pure paraxylene is 58° F. This temperative difference is difficult to handle in a simple wash column and accordingly a two wash column configuration is preferable.

The concentration of impurities in the intermediate recrystallizer depends completely on the efficiency of the first wash column. The following table shows the purity which is reached in the first wash column, the percentage with which almost 100% purity can be reached in the second wash column, and the percentage of additional crystals which has to be produced and melted (reflux) to reach that purity.

| purity in first wash column | purity liquid in intermediate recrystallizer | reflux |
|---|---|---|
| 0.99 | 0.8 | 5% |
| 0.99 | 0.85 | 7% |
| 0.975 | 0.8 | 14% |
| 0.975 | 0.85 | 20% |
| 0.95 | 0.8 | 33% |
| 0.95 | 0.85 | 50% |

If a third wash column stage is employed it can be calculated that with a purity of 95% after the first wash column, the reflux can be reduced to 4% of the production. Optimization of investment cost and energy cost yields the preferred number of stages.

It has been established that for a slurry containing crystals and a liquid with 85% paraxylene (45° F.) in a single wash column, a purity of 99,99% can be reached on full production scale.

Example 2

A mixture feed (F) containing 40% paraxylene is to be fed to a unit process as illustrated in FIG. 2. The object is to produce almost 100% pure paraxylene. The paraxylene is to be recovered to such a degree that the waste flow (W) contains 20% paraxylene.

A mixture feed of 4500 kg/hour will yield almost 1125 kg/hour of pure paraxylene and 3375 kg/hour of waste with 20% paraxylene.

Assuming that the system of FIG. 2 generates 300 kg/hour of crystals per stage in four stages, the following calculations are made:

| Recrystallizer | Paraxylene concentration | Equilibrium temperature °F. | Δ °F. |
|---|---|---|---|
| Stage I | 20% | −42° F. | >15 |
| Stage II | 26.3% | −27° F. | >11 |
| Stage III | 32.4% | −16° F. | >8 |
| Stage IV | 37.1% | −8° F. | |

Since at stage IV the concentration of paraxylene is 37.1%, two wash columns will be needed with an intermediate recrystallizer.

Example 3

A mixture feed (F) containing 80% paraxylene is to be fed to the unit process is illustrated in FIG. 2. The object is to produce almost 100% pure paraxylene. The paraxylene is to be recovered in the waste flow (W) at up to 9.5%.

A mixture feed of 4500 kg/hour of feed will yield almost 3505,5 kg/hour of pure paraxylene and 994.5 kg/hour of waste with 9.5% paraxylene.

Assuming that the unit process of FIG. 2 generates 900 kg/hour of crystals per stage in four stages, the following calculations are made.

| Recrystallizer | Paraxylene concentration | Equilibrium temperature °F. | Δ °F. |
|---|---|---|---|
| Stage I | 9.5% | −76° F. | >78 |
| Stage II | 44.2% | −2° F. | >23 |
| Stage III | 62.1% | −25° F. | >10 |
| Stage IV | 72% | −35° F. | |

Since at the stage IV recrystallizer the concentration of paraxylene is 72%, one wash column by itself may be adequate. However, because of the large increments in concentration between the recovery section stages, more stages are preferable in the recovery section of the unit process.

Example 4

Another example is the purification of paradichlorobenzene from a mixture with meta- and orthodichlorobenzene. A feed mixture with 60% paradichlorobenzene is to be fed to the unit process system of FIG. 3. In the waste flow 20% paradichlorobenzene is acceptable and the product has to be almost 100% pure. The mixture feed of 4500 kg/hour with 60% paradichlorobenzene is split up in 2250 kg/hour pure paradichlorobenzene and 2250 kg/hour with 20% paradichlorobenzene.

Assuming that the unit process of FIG. 3 generates 450 kg/hour of crystals per stage in five stages, the following calculations are made:

| Recrystallizer | concentration db | temperature °F. |
|---|---|---|
| Stage I | 20% | 12° F. |
| Stage II | 30 | 37.4° F. |
| Stage III | 38.2% | 53.6° F. |
| Stage IV | 44.9% | 63° F. |
| Stage V | 50.6% | 72° F. |

The slurry from the recrystallizer of stage V is to be mixed with the feed and charged to a wash column. The required purity will not be reached with only a one stage purification section and at least a second or a third stage will be needed. The same considerations are applicable as in previous examples.

In addition, the unit process of the present invention is suitable to purify a number of other chemicals including, but not limited to, chloro acetic acid
caprolactam
nitro chloro benzene
bisphenol-N
benzene
cresols
naphtaline
tolyene diisocyanate
salicylic acid
menthol
2,6 di-T-butyl-P-cresol
phenolic anti-oxidants
nitro diphenyl amine
adiphine acid
di (bi) chromate

What is claimed is:

1. A processing unit for the continuous purification of chemicals comprising,
   (a) a purification section comprised of a first wash column having a feed inlet and at least one stage, said stage comprised of,
      (i) a second wash column,
      (ii) a recrystallizer intermediate said wash columns,
      (iii) at least one filter associated with said recrystallizer, and
      (iv) at least one crystallizer for forming crystals to be fed to said recrystallizer,
   (b) a recovery section comprised of a plurality of stages, each stage except the stage adjacent said first wash column comprised of,
      (i) a recrystallizer,
      (ii) at least one filter associated with said recrystallizer,
      (iii) at least one crystallizer for forming crystals to be fed to said recrystallizer, and
      (iv) a thickener for concentrating the crystals removed from said recrystallizer, and
   (c) said stage adjacent said wash column comprised of,
      (i) a recrystallizer,
      (ii) at least one filter associated with said recrystallizer, and
      (iii) at least one crystallizer for forming crystals to be fed to said recrystallizer.

2. A processing unit for the continuous purification of chemicals comprising:
   (a) a purification section comprised of a wash column having a feed inlet,
   (b) a recovery section comprised of a plurality of stages, each stage except the stage adjacent said first wash column comprised of,
      (i) a recrystallizer,
      (ii) at least one filter associated with said recrystallizer,
      (iii) at least one crystallizer for forming crystals to be fed to said recrystallizer, and
      (iv) a thickener for concentrating the crystals removed from said recrystallizer, and
   (c) said stage adjacent said wash column is comprised of,
      (i) a recrystallizer,
      (ii) at least one filter associated with said recrystallizer, and
      (iii) at least one crystallizer for forming crystals to be fed to said recrystallizer.

3. A processing unit for the continuous purification of chemicals comprising,
   (a) a purification section comprised of a first wash column having a feed inlet and at least one stage, said stage comprised of,
      (i) a second wash column,
      (ii) a recrystallizer intermediate said wash columns,
      (iii) at least one filter associated with said recrystallizer, and
      (iv) at least one crystallizer for forming crystals to be fed to said recrystallizer, and
   (b) a recovery section comprised of a plurality of stages, each stage comprised of,
      (i) a recrystallizer,
      (ii) at least one filter associated with said recrystallizer, and
      (iii) at least one crystallizer for forming crystals to be fed to said recrystallizer.

4. The unit process according to claim 2 wherein said purification section has a second wash column in series with said first wash column.

5. The unit process according to claim 1, wherein said purification section has a heat exchanger intermediate said recrystallizer and said first wash column.

6. The unit process according to claim 3 wherein said purification section has a heat exchanger intermediate said recrystallizer and said first wash column.

7. The unit process according to claim 4 wherein said purification section has a heat exchanger intermediate said recrystallizer and said first wash column.

8. A process for purifying chemicals conprising the steps of
   (a) feeding a chemical to be purified to a wash column located within a purification section,
   (b) feeding to said wash column a slurry of liquid and crystals from a first recrystallizer located within a recovery section,
   (c) removing crystals from said wash column,
   (d) feeding at least a portion of the liquid from said wash column to a first crystallizer located within said recovery section,
   (e) crystallizing at least a portion of said liquid in said crystallizer,
   (f) feeding said crystals from said crystallizer to said first recrystallizer,
   (g) melting said crystals from said crystallizer in said first recrystallizer,
   (h) feeding a slurry of crystals and liquid from a thickener located within said recovery section to said first recrystallizer in said recovery section,
   (i) reforming the liquid from said melted crystals on said crystals from said thickener.

9. Process according to claim 8 further including the step of,
   (j) feeding said crystals from said wash column to a first recrystallizer located in said purification section, 10. Process according to claim 9 further including the steps of,
    (k) feeding a liquid from said purification recrystallizer to a heat exchange,
    (l) feeding said heated liquid to said wash column; and (m) melting in said wash column a portion of the outer layer of said crystals from said first recrystallizer in said recovery section.

11. A process for purifying chemicals comprising the steps of
   (a) feeding a chemical to be purified to a first wash column located within a purification section,
   (b) feeding to said first wash column a slurry of liquid and crystals from a first recrystallizer located within a recovery section,
   (c) removing crystals from said wash column,
   (d) feeding at least a portion of the liquid from said wash column to a first crystallizer located in the recovery section,
   (e) crystallizing at least a portion of said liquid in said crystallizer,
   (f) feeding said crystals from said crystallizer to said first recrystallizer,
   (g) melting said crystals in said first recrystallizer,
   (h) feeding a slurry of crystals and liquid from a second recrystallizer located within said recovery section to said first recrystallizer in said recovery section,
   (i) reforming the liquid from said melted crystals on said crystals from said second recrystallizer in said recovery section.

12. Process according to claim 11 further including the steps of,
   (j) feeding said crystals from said wash column to a first recrystallizer located in said purification section.

13. Process according to claim 12 further including the steps of,
   (k) feeding a liquid from said purification recrystallizer to a heat exchange,
   (l) feeding said heated liquid to said wash column, and
   (m) melting in said wash column a portion of the outer layer of said crystals from said first recrystallizer in said recovery section.

14. Process according to claim 13 further including the steps of,
   (n) feeding a slurry of liquid and crystals from said purification crystallizer to a second wash column,
   (o) feeding crystals from said record wash column to a second heat exchanger, and
   (p) melting said crystals in said second heat exchange thereby producing said purified chemical.

15. Process according to claim 10 further including the steps of
   (n) feeding a slurry of liquid and crystals from said purification crystallizer to a second wash column,
   (o) feeding crystals from said record wash column to a second heat exchanger, and
   (p) melting said crystals in said second heat exchange thereby producing said purified chemical.

16. Process according to claim 8 further including the steps of
   (j) feeding said crystals from said wash column to a second heat exchanger, and
   (l) melting said crystals in said second heat exchange thereby producing said purified chemical.

17. Process according to claim 11 further including the steps of
   (j) feeding said crystals from said wash column to a second heat exchanger, and
   (l) melting said crystals in said second heat exchange thereby producing said purified chemical.

* * * * *